US010386252B2

(12) United States Patent
Eguchi (10) Patent No.: US 10,386,252 B2
(45) Date of Patent: Aug. 20, 2019

(54) POSITION CONTROL APPARATUS FOR IDENTIFYING LOW-FREQUENCY DISTURBANCE

(71) Applicant: Okuma Corporation, Niwa-gun, Aichi (JP)

(72) Inventor: Satoshi Eguchi, Niwa-gun (JP)

(73) Assignee: OKUMA CORPORATION (JP)

( * ) Notice: Subject to any disclaimer, the term of this patent is extended or adjusted under 35 U.S.C. 154(b) by 1009 days.

(21) Appl. No.: 14/464,820

(22) Filed: Aug. 21, 2014

(65) Prior Publication Data

US 2015/0057955 A1  Feb. 26, 2015

(30) Foreign Application Priority Data

Aug. 26, 2013  (JP) .................. 2013-174137

(51) Int. Cl.
*G01L 3/02* (2006.01)
*G01L 3/24* (2006.01)
(52) U.S. Cl.
CPC ............. *G01L 3/02* (2013.01); *G01L 3/242* (2013.01)
(58) Field of Classification Search
CPC ......... B23Q 17/12; B23Q 1/4857; G01L 3/02; G01L 3/242; F24F 3/1603; B23H 3/02
USPC .............................................. 173/176; 108/2
See application file for complete search history.

(56) References Cited

U.S. PATENT DOCUMENTS 4,883,568 A * 11/1989 Kuwabara ............. B23H 3/02
                                                        205/649
8,034,169 B2 * 10/2011 Yamashita ........... F24F 3/1603
                                                         96/245
2008/0169778 A1   7/2008 Eguchi
2012/0097411 A1 * 4/2012 Yoshino ............... B23Q 17/12
                                                        173/176
2012/0266783 A1 * 10/2012 Yoshida ............... B23Q 1/4857
                                                         108/2

FOREIGN PATENT DOCUMENTS

JP      4673326 B2    4/2011

OTHER PUBLICATIONS

Chinese Office Action for Chinese Patent Application No. 201410425554.6, dated Aug. 1, 2017, 3 pages.
Kanai, Kimio, "Robust adaptive control introductory", Ohmsha, Ltd., 1989, pp. 62-63, Japan.
Japanese Office Action for Japanese Patent Application No. 2013-174137, dated Mar. 21, 2017. 4 pages.

* cited by examiner

*Primary Examiner* — Regis J Betsch
*Assistant Examiner* — Kaleria Knox
(74) *Attorney, Agent, or Firm* — McCarter & English, LLP (57) ABSTRACT A position control apparatus is provided that can perform accurate nonlinear compensation control immediately after the apparatus is activated. At a time of acceleration, a signal amplification ratio is calculated and designated for each signal vector element based on information related to acceleration/deceleration at a starting time and the structure of a signal vector that is determined for a target plant, and as a result, a signal vector for which the strength of linear independence is increased is generated. Because the strength of the linear independence condition of the signal vector is increased, the speed of convergence of identification for a low-frequency disturbance element, such as a gravitational torque or a sliding-mode load torque, can be increased.

5 Claims, 11 Drawing Sheets

POSITION CONTROL APPARATUS FOR IDENTIFYING LOW-FREQUENCY DISTURBANCE

CROSS-REFERENCE TO RELATED APPLICATIONS

This application claims priority under 35 U.S.C § 1.119 (a)-(d) to Japanese Patent Application No. 2013-174137, filed on Aug. 26, 2013, which is incorporated herein by reference in its entirety as part of the present disclosure.

FIELD OF THE INVENTION

The present invention relates to a position control apparatus that performs axis control of a numerically controlled machine, and relates particularly to a position control apparatus that identifies a characteristic parameter for a target plant that is a mechanical plant to be controlled, and that additionally provides compensatory control based on the characteristic parameter in accordance with the characteristic of the target plant.

BACKGROUND OF THE INVENTION

Figure 5:
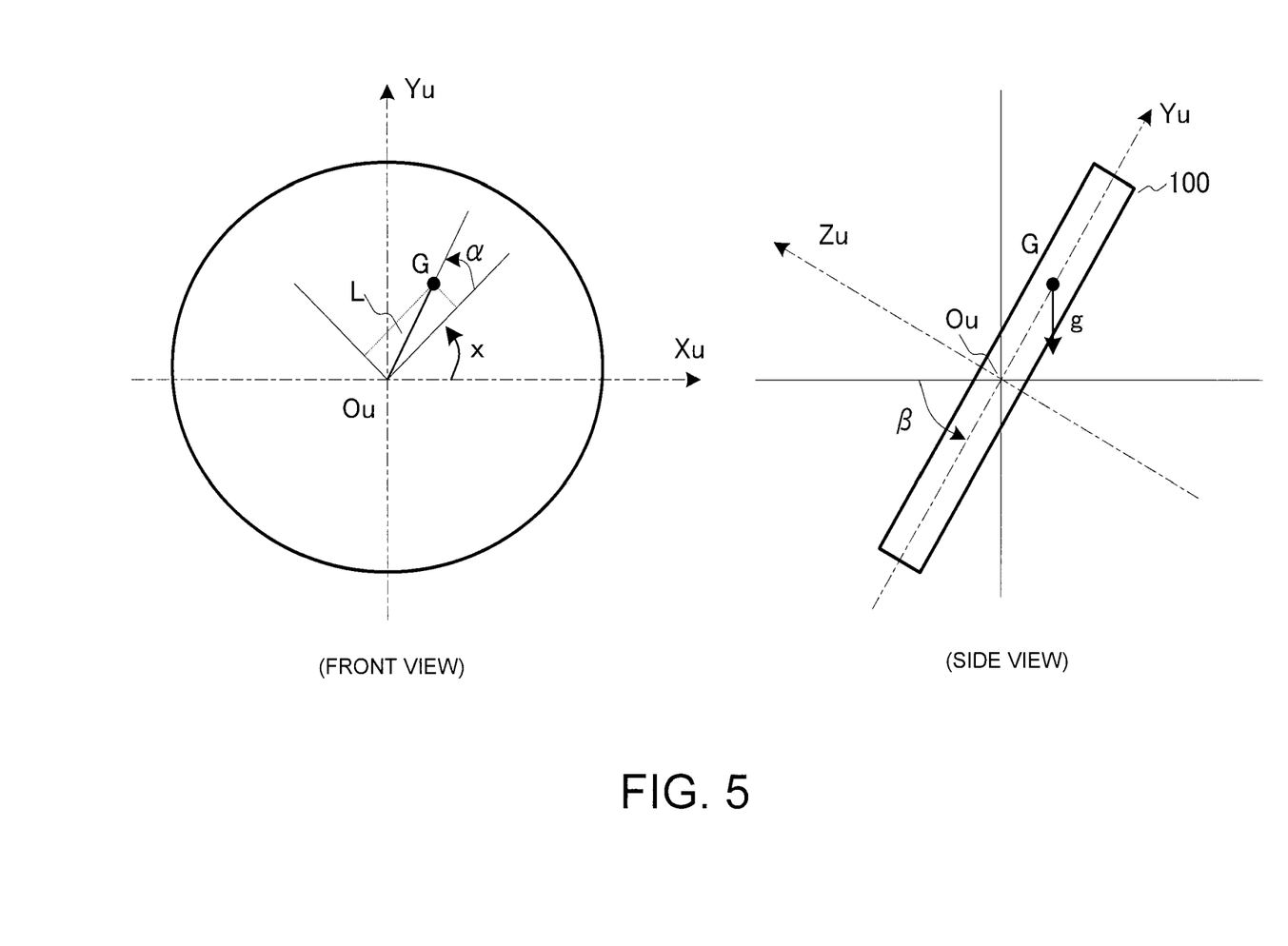
FIG. 5 is a schematic diagram for explaining a tilting rotary table.

Assume that a tilting rotary table 100 in FIG. 5 (inclination angle β) is employed as a target plant to be controlled. The rotary table 100 performs rotational motion at a rotation angle x along a rotation axis Zu that is directly connected to a servo motor (not shown). It is noted that gravity center G is regarded as being present at a location at a distance L apart from an on origin Ou for the angle of rotation and forward from a rotation angle=0 by an angle α. The position control apparatus exercises position control, so that a position command value X issued by a host apparatus (not shown) through the performance of function generation matches the rotation angle x.

Figure 6:
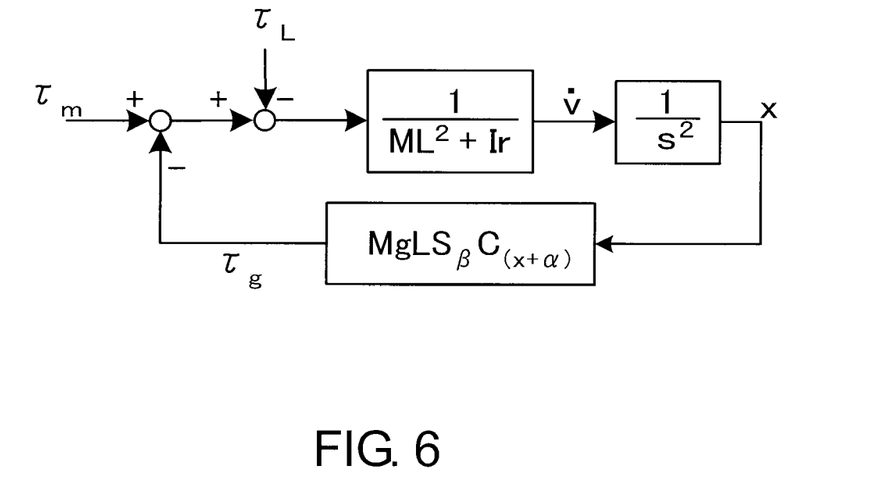
FIG. 6 is a block diagram representing the equation of motion of the tilting rotary table.

Thereafter, an equation of motion is introduced for the tilting rotary table 100 in FIG. 5. In this case, the rotation angle x can be employed as generalized coordinates, and the following equation of motion (1) is obtained. FIG. 6 is a block diagram representing this equation of motion (hereinafter, SIN β is referred to as "$S_\beta$" and COS(x+α) is referred to as "$C_{(x+\alpha)}$").

$$\tau_m = (ML^2 + Ir)(dv/dt) + MgLS_\beta C_{(x+\alpha)} + \tau_L \quad (1)$$

Here, $\tau_m$ is a torque generated by a motor, M is mass for the entire rotary table 100, Ir is moment of inertia for the entire rotary table 100 (including the motor) around the axis parallel with the rotation axis that passes the center of gravity, v is a rotation angular velocity, g is gravitational acceleration, $\tau_g = MgLS_\beta C_{(x+\alpha)}$ is a gravitational torque, and $\tau_L$ is a sliding-mode load torque.

When a 4-dimensional signal vector ξ and a parameter vector γ are defined by employing equations (2) and (3), motion equation (1) can be replaced with equation (4) by using well known parametric representation (hereinafter, the transposition of a vector or a matrix is represented with a superscript "$T$"). As is apparent from equation (2), the signal vector ξ employs angular acceleration and a rotation angle as elements.

$$\xi = [dv/dt, C_x, -S_x, 1]^T \quad (2)$$

$$\gamma = [ML^2 + Ir, MgLS_\beta C_\alpha, MgLS_\beta S_\alpha, \tau_L]^T \quad (3)$$

$$\tau_m = \xi^T \gamma \quad (4)$$

Figure 7:
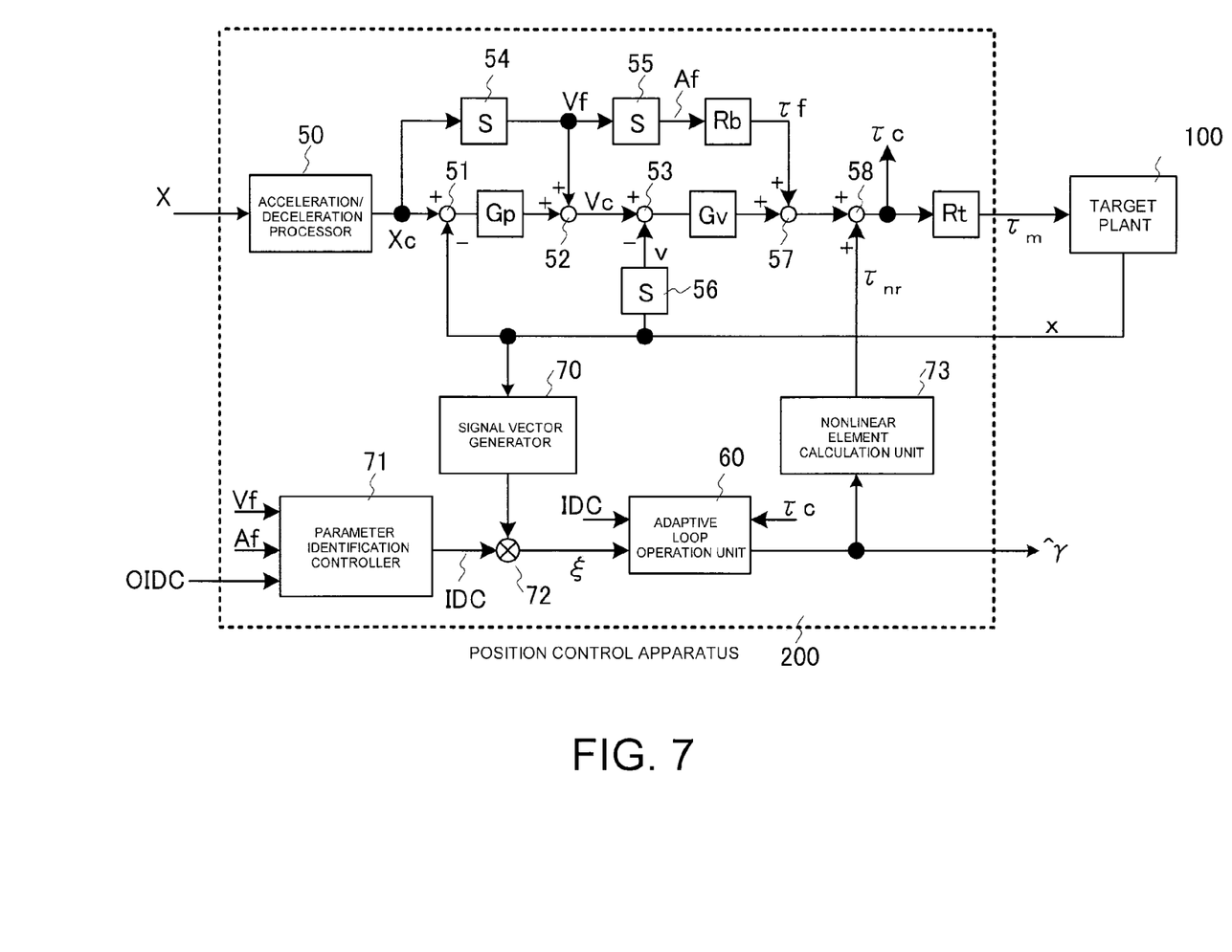
FIG. 7 is a block diagram showing an example arrangement of a conventional position control apparatus.

FIG. 7 is a block diagram illustrating an example conventional position control apparatus 200 that controls a rotation angle x around a rotation axis based on a position command value X that a host apparatus (not shown) issues by performing function generation for each predetermined period of time. The position control apparatus 200 in this example includes an arrangement in which compensation control is additionally provided to identify a characteristic parameter for a target plant 100 and to employ a value for the parameter that is identified. The operation of the conventional position control apparatus 200 in FIG. 7 will now be described.

In FIG. 7, a feedforward structure is employed in order to increase a command and response speed. Specifically, an acceleration/deceleration processor 50 performs an acceleration/deceleration process for a position command value X to provide appropriate acceleration or jerk, and outputs the resultant position command Xc. A differentiator 54 performs time differentiation for the position command Xc to obtain velocity feedforward Vf, and further, a differentiator 55 performs time differentiation for the velocity feedforward Vf to obtain acceleration feedforward Af. An amplification ratio Rb of an amplifier Rb is a constant to obtain acceleration/deceleration torque feedforward if that corresponds to a motor torque, with which the acceleration feedforward Af is to be generated by a target plant 100 (a rotary table in this case).

The following feedback arrangement is employed. First, a rotation angle detector (not shown) detects the rotation angle x, a subtractor 51 subtracts the rotation angle x from a position command value Xc, and a position deviation amplifier Gp amplifies a position deviation that is the result output by the subtractor 51. An adder 52 adds the resultant position deviation to the velocity feedforward Vf, and obtains a velocity command value Vc. A subtractor 53 subtracts, from the velocity command value Vc, a rotation angular velocity v that is obtained by a differentiator 56 through differentiation of the rotation angle x, and thereafter, generally, a velocity deviation amplifier Gv performs proportional integration and amplification for the velocity deviation output by the subtractor 53.

An adder 57 adds the output of the velocity deviation amplifier Gv to the acceleration/deceleration torque feedforward τf, and obtains a torque command value τc, and a power amplifier Rt multiplies the torque command value τc by Rt times. Rt is a constant determined in accordance with the characteristic of a servo motor, and the obtained output $\tau_m$ is employed as a torque generated by the servo motor to drive the target plant 100 (in this case, a rotary table). An adaptive loop operation unit 60 is a block that, based on the torque command value τc and the signal vector ξ, calculates an identified parameter vector ^γ that is an estimated value for a parameter vector γ.

Figure 8:
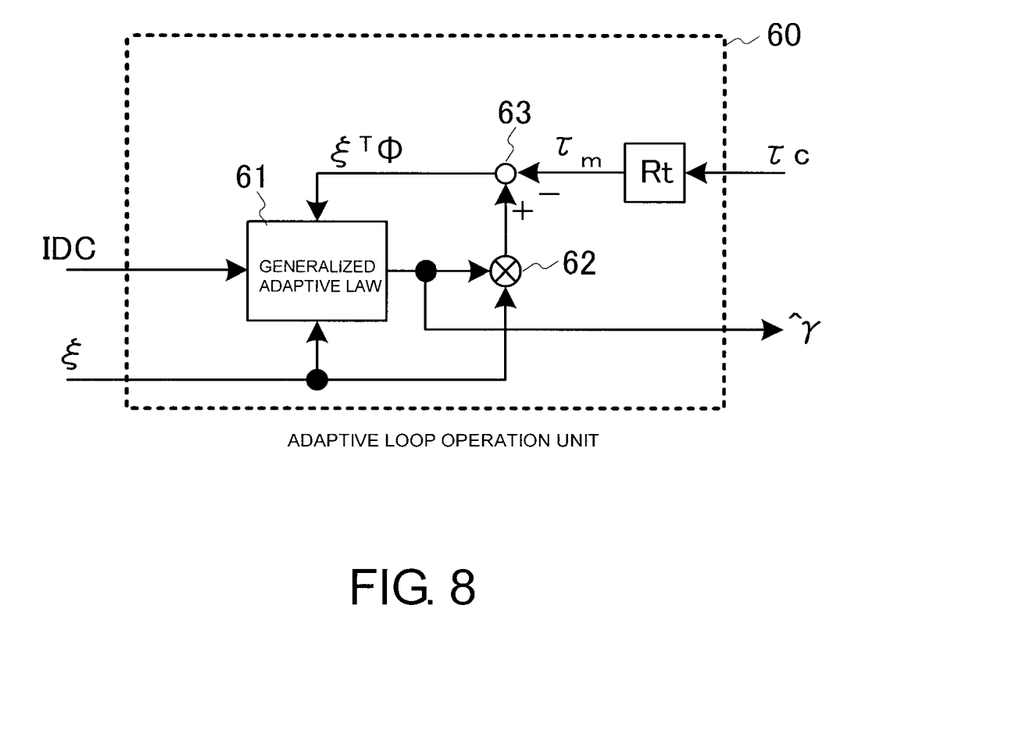
FIG. 8 is a block diagram for explaining the structure of an adaptive loop operation unit.

FIG. 8 is a block diagram illustrating the internal arrangement of the adaptive loop operation unit 60. A generalized adaptive law 61 is employed to calculate the identified parameter vector ^γ(k) based on equations (5) and (6) that are well known in, for example, "Introduction of Robust Adaptive Control" (Kimio Kanai, Fifth Edition, Ohmsha, Ltd., published on Dec. 10, 1994, pp. 62-63) (hereinafter, of time-series signals generated for each specific sampling period of time, a signal in the k-th cycle is represented by (k)).

$$\hat{\gamma}(k) = \hat{\gamma}(k-1) - P(k-1)\xi(k)\xi(k)^T \Phi(k) \quad (5)$$

$$P(k)^{-1} = C_1(k)P(k-1)^{-1} + C_2(k)\xi(k)\xi(k)^T \quad (6)$$

Here, P(k) denotes a gain matrix having an initial value of P(0), and it is assumed that $0 < C_1(k) \leq 1$, $0 \geq C_2(k) < 2$, and $P(0) > 0$ is established.

At this time, a scalar-tracking error $\xi(k)^T \Phi(k)$ is a signal obtained after the subtractor 63 subtracts the torque $\tau_m(k) = \xi(k)^T \cdot \gamma$, generated by the servo motor, from a scalar signal $\xi(k)^T \cdot \hat{\gamma}(k)$ that is obtained by the multiplier 62 by multiplying the signal vector $\xi(k)$ by the identified parameter vector $\hat{\gamma}(k)$. That is, the scalar-tracking error $\xi(k)^T \Phi(k)$ can be represented as the following equation (7) by employing $\hat{\gamma}(k)$ in equation (5).

$$\xi(k)^T \Phi(k) = \xi(k)^T (\hat{\gamma}(k) - \gamma) = \xi(k)^T \cdot \hat{\gamma}(k) - \tau_m(k) =$$

$$\xi(k)^T \{\hat{\gamma}(k-1) - P(k-1) \cdot \xi(k) \cdot \xi(k)^T \Phi(k)\} - \tau_m(k) \quad (7)$$

When equation (7) is rearranged for the scalar-tracking error $\xi(k)^T \Phi(k)$, equation (8) is obtained. When equation (8) is substituted into equation (5) described above, $\hat{\gamma}(k)$ can be calculated by employing $\hat{\gamma}(k-1)$.

$$\xi(k)^T \Phi(k) = \{\xi(k)^T \cdot \hat{\gamma}(k-1) - \tau_m(k)\} / \{1 + \xi(k)^T P(k-1) \xi(k)\} \quad (8)$$

Meanwhile, as for convergence of identification by employing a signal matrix $\Xi(k)$ in equation (9), $$\Xi(k) = [\xi(1), \xi(2), \ldots, \xi(k)]^T \quad (9)$$

where signal vectors $\xi(k)^T$ are arranged along rows in a time series manner, it is well known that, so long as linear independence is continuously established among the individual column vectors (hereinafter, expression of "having full column rank" is also employed), convergence of $\hat{\gamma}(k) \to \gamma$ occurs with $k \to \infty$, and identification of a parameter is established, and it is also known that the speed of convergence response is increased as the linear independence increases among the column vectors of $\Xi(k)$.

Referring again to FIG. 7, the operation of the conventional position control apparatus 200 will be described. A signal vector generator 70 calculates trigonometric functions for the rotary angle x to obtain $C_x$ (=COS x) and $-S_x$ (=−SIN x), and performs differentiation for the rotary angular velocity v to obtain dv/dt. That is, the signal vector generator 70 serves as a block that generates the original signal for the signal vector $\xi$ in equation (2). It should be noted that this output is multiplied in the multiplier 72 by a binary (1 or 0) signal IDC of a parameter identification controller 71, and a signal vector $\xi$ that is to be entered to the adaptive loop operation unit 60 is obtained. In this case, since the signal vector $\xi = 0$ is established when the binary signal IDC=0, it is found that the parameter identification operation is halted based on equation (5).

Since the parameter identification operation is not performed when the column full rank property of the signal matrix $\Xi(k)$ in equation (9) cannot be obtained, the essential condition for parameter identification is that $dv/dt \neq 0$ should be established for the signal vector $\xi$ in equation (2) (dv/dt=0 should not be continued). Therefore, the parameter identification controller 71 detects the acceleration state based on the velocity feedforward Vf and the acceleration feedforward Af, and internally sets a binary signal INIDC=1 as a condition required for performing the parameter identification operation only during a period of acceleration and during a period of setting time (a predesignated value) after the acceleration has been completed.

A binary signal OIDC is a signal, for which the host apparatus outputs a value of 0 to halt the parameter identification operation in a case wherein it is assumed that a contact or manipulation due to an external environment occurs with respect to the target plant 100. The final binary signal IDC of the parameter identification controller 71 is determined by equation (10).

$$\text{IDC} = \text{OIDC} \cap \text{INIDC} \quad (10)$$

That is, the binary signal IDC=1 is output only when both the parameter identification operation condition (OIDC=1) output by the host apparatus and the parameter identification operation condition (INIDC=1) detected by the parameter identification controller 71 are established. When the value of the binary signal IDC is changed from 0 to 1, the adaptive loop operation unit 60 sets a predesignated initial value P(0) to the gain matrix P(k), and performs a series of adaptive loop calculations, represented by equations (8), (5) and (6), in the individual sampling time periods, to obtain the identified parameter vector $\hat{\gamma}(k)$.

In this case, the second, third and fourth elements of the identified parameter vector $\hat{\gamma}(k)$ are $\widehat{MgLS_\beta C_\alpha}$, $\widehat{MgLS_\beta C_\alpha}$ and $\hat{\tau}_L$. A nonlinear element calculation unit 73 calculates $C_{Xc}$ and $-S_{Xc}$ for the position command value Xc, and calculates equation (11) to determine a nonlinear element torque compensation value $\tau_{nr}$.

$$\tau_{nr} = (1/Rt)\{\widehat{MgLS_\beta C_\alpha} C_{Xc} + \widehat{MgLS_\beta S_\alpha}(-S_{Xc}) + \hat{\tau}_L\} = (1/Rt)\{\hat{\tau}_g + \hat{\tau}_L\} \quad (11)$$

Since $Rt \cdot \tau_{nr}$ is the sum of estimated values for the second term (gravitational torque) and the third term (sliding-mode load torque) of the right side of motion equation (1), both of which are nonlinear elements, the output of the adder 57 and $\tau_{nr}$ are added together by an adder 58 to enable the performance of feedforward compensation for the nonlinear elements.

The strength of linear independence will now be described. First, the signal matrix $\Xi(k)$ represented by equation (9) is expanded. Equation (12) is obtained by performing expansion for the matrix $\Xi(k)$ (m×n) for the past m cycles.

$$\Xi(k) = [\xi(k-m+1), \xi(k-m+2), \ldots, \xi(k)]^T = \begin{bmatrix} \xi_1(k-m+1), \xi_2(k-m+1), \ldots, \xi_n(k-m+1) \\ \xi_1(k-m+2), \xi_2(k-m+2), \ldots, \xi_n(k-m+2) \\ \vdots \\ \xi_1(k), \xi_2(k), \ldots, \xi_n(k) \end{bmatrix} = \quad (12)$$

$$[\xi_1, \xi_2, \ldots, \xi_n](m \times n)$$

In this case, since the signal vector $\xi$ has four dimensions as represented in equation (2), n=4 is obtained and $\xi_1$ is a column vector consisting of dv/dt arranged in the direction of rows in a time series manner, $\xi_2$ is a column vector consisting of $C_x$ arranged in the direction of rows in a time series manner, $\xi_3$ is a column vector consisting of $-S_x$ arranged in the direction of rows in a time series manner, and $\xi_4$ is a column vector consisting of 1 arranged in the direction of rows in a time series manner.

Generally, a ratio of the minimum singular value $\sigma_{min}$ to the maximum singular value $\sigma_{max}$ of a matrix is employed as an index that represents the strength of the linear independence condition of column vectors in the matrix. The range of the ratio is represented by equation (13), and as the range is extended, it can be assumed that the linear independence becomes strong.

$$0 \leq (\sigma_{min}/\sigma_{max}) \leq 1 \quad (13)$$

For example, an identity matrix is a matrix for which the individual column vectors are orthonormal vectors that are in the extremely strong linear independence condition, and for which $\sigma_{min}/\sigma_{max}=1$ is established. In a case wherein a matrix does not have column full rank (the individual column vectors are not linearly independent), $\sigma_{min}=0$ is obtained, and $\sigma_{min}/\sigma_{max}=0$ is established.

Meanwhile, it is known that when matrix A(m×n) is multiplied by arbitrary vector y(n x) having a magnitude of 1 ($\|y\|=1$), a magnitude $\|Ay\|$ of the obtained vector Ay(m×1) falls in the range represented by equation (14).

$$\sigma_{min}(A) \le \|Ay\| \le \sigma_{max}(A); \text{ note: } \|y\|=1 \qquad (14)$$

When the relationship of equation (14) is applied for the signal matrix $\Xi(k)$ in equation (12), and when the maximum absolute elements $\xi_{*\_max}$ are compared with each other for the individual column vectors $\xi_*$ (*=1, 2, . . . , n) in equation (12), the outline of a relationship of "the minimum $\xi_{*\_max}$" $\Rightarrow \sigma_{min}(\Xi)$ and "the maximum $\xi_{*\_max}$" $\Rightarrow \sigma_{max}(\Xi)$ is established, and therefore, as the ratio of the maximum value for $\xi_{*\_max}$ to the minimum value for $\xi_{*\_max}$ is reduced (a value indicated by the minimum value for $\xi_{*\_max}$/the maximum value for $\xi_{*\_max}$ is increased), the strength of linear independence for the single matrix $\Xi(k)$ is increased.

When the signal matrix $\Xi(k)$ continuously has column full rank, estimation calculation for the identified parameter vector $\hat{\gamma}(k)$ is converged to the actual parameter vector $\gamma$. However, for identifying a low-frequency disturbance element, such as a gravitational torque or a sliding-mode load torque, represented in this example, the amplitude and the time-transient change of a corresponding signal element (specifically, the second, third or fourth element of the signal vector $\xi(k)$ in equation (2)) is small, and therefore, the strength of the linear independence of the column vectors of the signal matrix $\Xi(k)$ is lowered, and accordingly, the identification convergence is delayed and accurate nonlinear compensation control cannot be performed.

Figure 9:
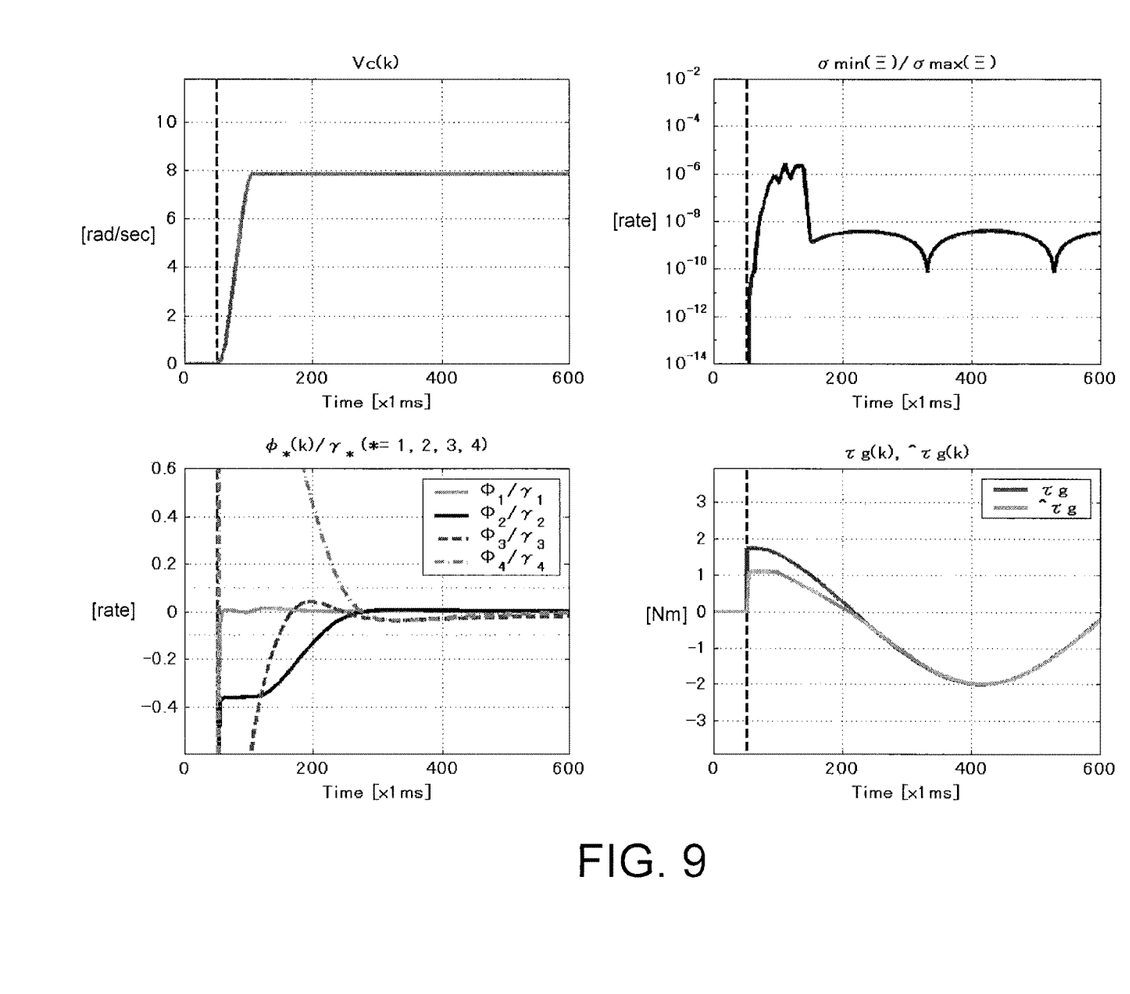
FIG. 9 is a diagram showing an example convergence response of identification performed by the conventional position control apparatus.

Graphs in FIG. 9 represent an example convergence characteristic for parameter identification performed by the conventional position control apparatus 200 in FIG. 7. The upper left graph shows a time-series velocity command value Vc(k) (=Xc(k)−Xc(k−1)) issued during the position control operation. At the time of 50 ms along the time axis, acceleration is generated in the positive direction from Xc=0, and thereafter, a binary signal IDC=1 is obtained to validate the performance of identification operation. The target plant 100 is defined in equation (1) as $ML^2+Ir=0.04$ [kg·m$^2$], $|\tau_g|=MgLS_\beta=2$ [Nm], $\alpha=\pi/6$ [rad], and $\tau_L=1$ [Nm].

In this example, since the maximum acceleration is 200 [rad/s$^2$] (=8 [rad/s]/0.04 [s]), $\xi_{1\_max}=200$, $\xi_{2\_max}=\xi_{3\_max}=\xi_{4\_max}=1$ is obtained, and the ratio of the maximum value of $\xi_{*\_max}$ to the minimum value is large (the minimum value of $\xi_{*\_max}$/the maximum value of $\xi_{*\_max}$ is small), and therefore, the linear independence of the signal matrix $\Xi(k)$ is not strong. The upper right graph shows the ratio of the minimum singular value $\sigma_{min}(\Xi)$ to the maximum singular value $\sigma_{max}(\Xi)$ for the signal matrix $\Xi(k)$ in the past 20 cycles. As described above, by employing equation (13), the strength of the linear independence for the column vectors that varies from moment to moment is represented.

The lower left graph shows the convergence response of identification. Since the vertical axis represents $\Phi_*(k)/\gamma_*=(\hat{\gamma}_*(k)-\gamma_*)/\gamma_*$ (*=1, 2, 3, 4), an approach to 0 indicates convergence. In this case, the identification of low-frequency disturbance elements for a gravitation torque and a sliding-mode load torque is delayed, and a period of 200 ms is required from the start of acceleration until an identification error of within 10%. The lower right graph shows a comparison between a gravitational torque $\tau_g(k)=MgLS_\beta$ $C_{(x+\alpha)}$ and an estimated gravitational torque $\hat{\tau}_g(k)$, which is introduced based on the second and third elements ($\hat{MgLS_\beta C_\alpha}$ and $\hat{MgLS_\beta S_\alpha}$) of the identified parameter vector $\hat{\gamma}(k)$. It is apparent that $\hat{\tau}_g(k)$ approaches and matches $\tau_g(k)$ in the same period of time required for the identification convergence in the lower left graph.

Figure 10:
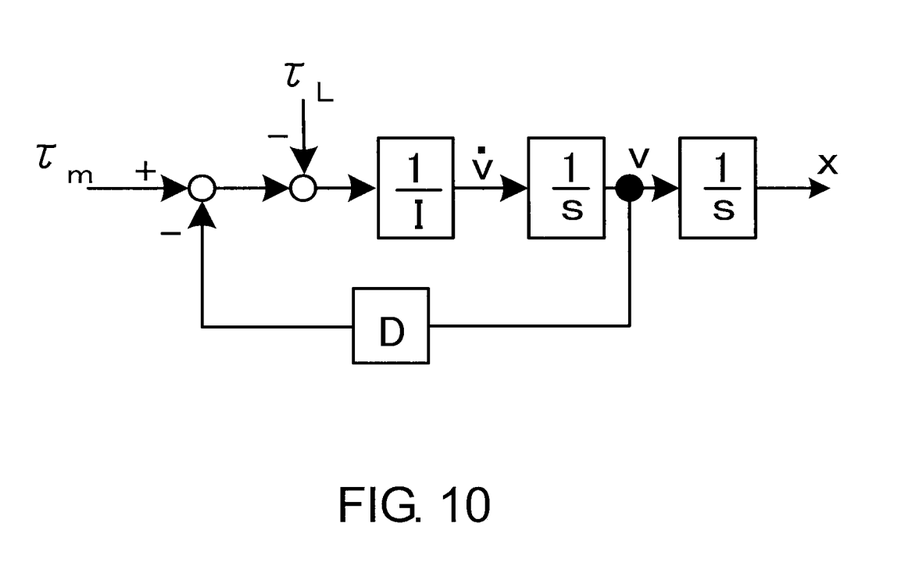
FIG. 10 is a block diagram representing the equation of motion of a linear motion table.

Next, an example wherein a linear motion table is employed as the target plant 100 will be described. Equation (15) is provided as an equation of motion, and FIG. 10 is provided as a block diagram to represent equation (15).

$$\tau_m=I(dv/dt)+Dv+\tau_L \qquad (15)$$

In this equation, $\tau_m$ denotes a torque generated by a motor, I denotes moment of inertia of the whole unit (including a motor), v denotes a velocity, D denotes a viscous resistance and $\tau_L$ denotes a sliding-mode load torque. Parametric representation for this case is provided by equations (16) and (17).

$$\xi=[dv/dt,v,1]^T \qquad (16)$$

$$\gamma=[I,D,\tau_L]^T \qquad (17)$$

Figure 11:
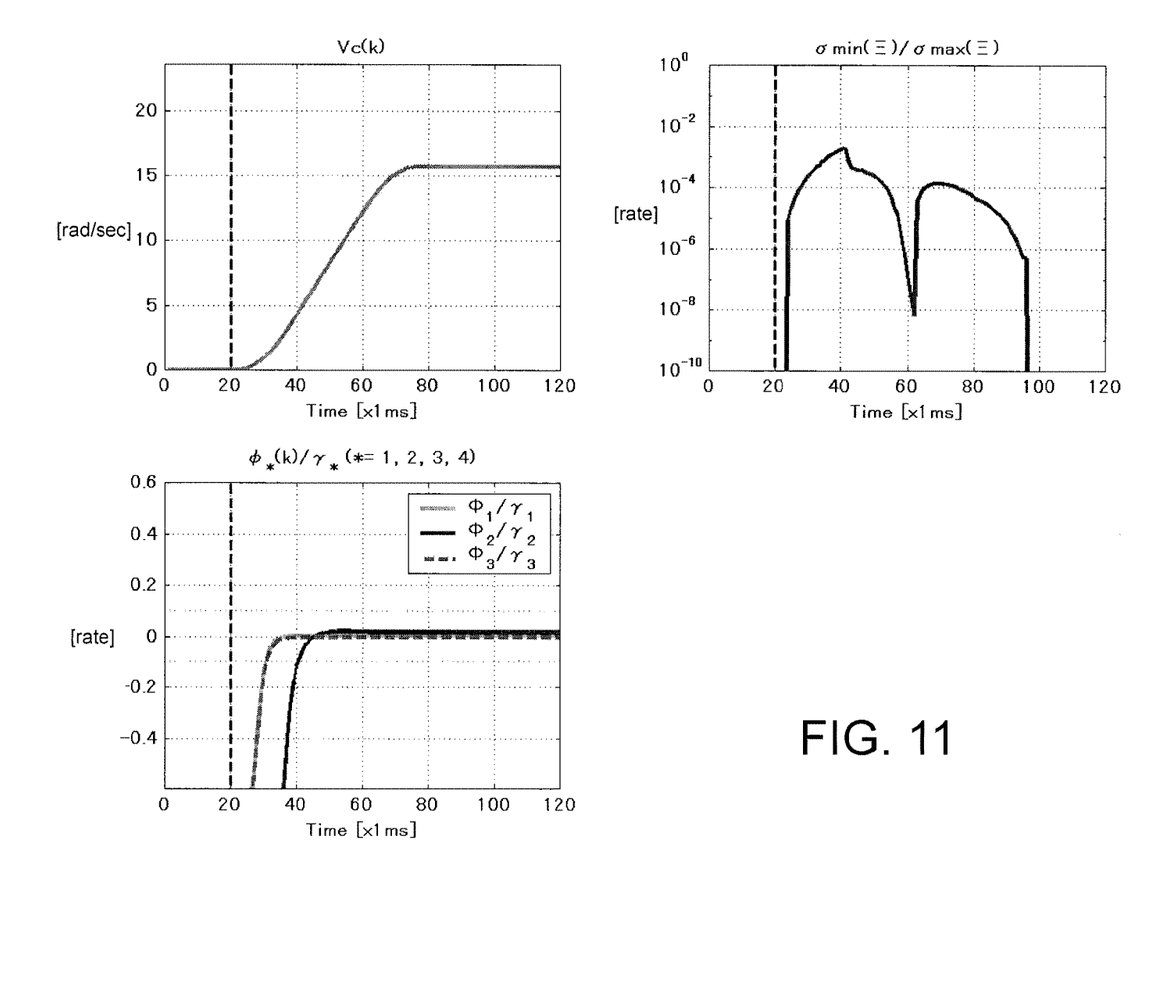
FIG. 11 is a diagram showing another example for the convergence response of identification performed by the conventional position control apparatus.

Graphs in FIG. 11 show an example convergence characteristic of parameter identification of the conventional position control apparatus 200 in this case. In this example, acceleration with the maximum velocity of 16 [rad/s] and the maximum acceleration of 400 [rad/s$^2$] is generated at a time of 20 ms along the time axis in the positive direction, and thereafter, the binary signal IDC=1 is obtained to validate the identification operation. In equation (15), the target plant 100 is defined as I=6.5·10$^{-4}$ [kg·m$^2$], D=0.01 [Nm/(rad/s)] and $\tau_L=1$ [Nm].

As in FIG. 9, the upper left graph of FIG. 11 shows a time-series velocity command value Vc(k), the upper right graph shows $\sigma min(\Xi)/\sigma max(\Xi)$ that is obtained by calculating the signal matrix $\Xi(k)$ for the past 20 cycles, and the lower left graph shows the convergence response of identification. In this example, $\xi_{1\_max}=400$, $\xi_{2\_max}=16$ and $\xi_{3\_max}=1$ are also obtained, and therefore, the ratio of the maximum value for $\xi_{*\_max}$ to the minimum value is large, and the linear independence of the signal matrix $\Xi(k)$ is not strong. In this case, identification for the viscous resistance D is especially delayed, and for convergence of identification, a period of 20 ms or longer is required from the start of acceleration.

SUMMARY OF THE INVENTION

One objective of the present invention is to provide a position control apparatus that can increase a speed for convergence of identification for a low-frequency disturbance element, such as a gravitational torque or a sliding-mode load torque, and therefore, can perform accurate nonlinear compensation control immediately after the apparatus is started.

When a target to be controlled is determined, the equation of motion for the target plant can be formed, and the structure of a signal vector $\xi$ can be determined. In order to resolve the above described problems, according to the present invention, at the time of acceleration, a signal amplification ratio $\lambda$ is designated for each signal vector element based on information related to acceleration/deceleration when the apparatus is started and the structure of the signal vector $\xi$, so that the signal vector $\xi$ for which the strength of linear independence is increased is to be generated, and convergence of identification of the low-frequency disturbance element is to be performed at a higher speed.

According to the position control apparatus of this invention, the speed for convergence of identification of a low-frequency disturbance element, such as a gravitational torque or a sliding-mode load torque, can be increased, and the accurate identification can be performed immediately after the apparatus is started. Therefore, in a case where the axial movement distance is short, or where a mechanical parameter is suddenly changed, an appropriate amount of compensation can be quickly calculated, and accurate non-linear compensation control can be performed.

DETAILED DESCRIPTION OF EMBODIMENTS THE INVENTION

Figure 1:
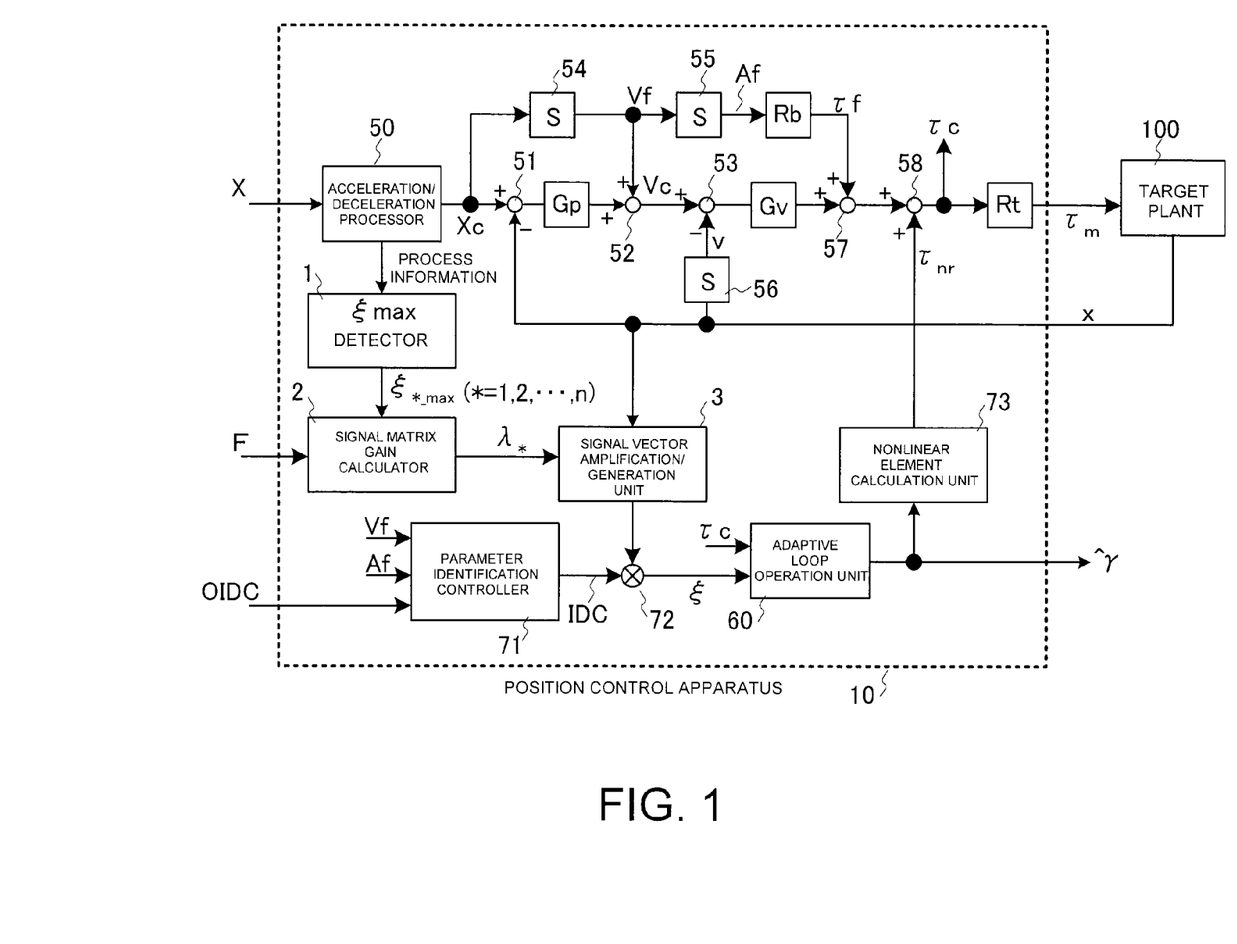
FIG. 1 is a block diagram illustrating an example arrangement for a position control apparatus according to the present invention.

Embodiments of the present invention will now be described with reference to examples. FIG. 1 is a block diagram illustrating an example for a position control apparatus 10 according to the present invention. Different portions from those of the prior art described above will be described below. An acceleration/deceleration processor 50 holds, at the time of starting, process information related to acceleration/deceleration, such as the maximum velocity or an acceleration/deceleration period, in order to perform the acceleration/deceleration processing for a position command value X, which a host apparatus (not shown) issues by performing function generation for each predetermined period, and to provide appropriate acceleration or jerk.

At the starting time by acceleration, a $\xi_{max}$ detector 1 estimates and outputs at the time of starting acceleration, the maximum absolute element $\xi_{*\_max}$ (*=1, 2, ..., n), based on the above described process information, for each column vector $\xi_*$ (*=1, 2, ..., n) included in a signal matrix $\Xi(k)$ in the acceleration condition. In this embodiment, when a tilting rotary table is employed as used for the prior art, $\xi_{1\_max}$=maximum acceleration [rad/sec$^2$], $\xi_{2\_max}$=1, $\xi_{3\_max}$=1 and $\xi_{4\_max}$=1 is obtained with n=4, and therefore, generally, $\xi_{1\_max}$ is overwhelmingly great.

A signal matrix gain calculator 2 is employed for the purpose of increasing the strength of linear independence for the individual column vectors of the signal matrix $\Xi(k)$. The signal matrix gain calculator 2 receives the maximum absolute elements $\xi_{*\_max}$ (*=1, 2, ..., n) that are output by the $\xi_{max}$ detector 1 for the individual column vectors $\xi_*$ (*=1, 2, ..., n), and selects for $\xi_{max}$ the maximum value among these elements to calculate a signal amplification ratio $\lambda_*$ (*=1, 2, ..., n) for the individual column vectors of the signal matrix $\Xi(k)$.

As an example, the signal amplification ratio $\lambda_*$ is determined by calculating the following equation (18).

$$\begin{cases} (a) \text{ In the case of } (\xi_{max}/\xi_{*\_max}) < 10, \\ \quad \lambda_* = 1 \\ (b) \text{ In the case of } (\xi_{max}/\xi_{*\_max}) \geq 10, \\ \quad \lambda_* = \left(\frac{\xi_{max}}{\xi_{*\_max}}\right)^{1/2} \times F \end{cases} \quad (18)$$

In this case, a reference signal amplification ratio F is a constant having a magnitude of about 1 that is eternally designated in advance to the signal matrix gain calculator 2.

A signal vector amplification/generation unit 3 for this embodiment multiplies the individual elements of a signal vector $\xi$ by the signal amplification ratio $\lambda_*$ to generate an identification signal vector $\bar{\xi}$. That is, parametric equations (2) and (3) are replaced with (19) and (20), and the output of the signal vector amplification/generation unit 3 is represented by equation (19).

$$\bar{\xi}=[\lambda_1 \cdot dv/dt, \lambda_2 \cdot C_x, \lambda_3 \cdot -S_x, \lambda_4]^T \quad (19)$$

$$\gamma=[(ML^2+Ir)/\lambda_1, MgLS_B C_\alpha/\lambda_2, MgLS_B S_\alpha/\lambda_3, \tau_L/\lambda_4]^T \quad (20)$$

It should be noted that representation of equation (4) is invariant.

The adaptive loop operation for parameter identification is thereafter performed, by employing the identification signal vector $\bar{\xi}$ represented by equation (19), in the same manner as for the conventional position control apparatus. However, since a value of the identification parameter vector $\hat{\gamma}(k)$ is converged, as represented by equation (20), the individual terms must be applied by the signal amplification ratio $\lambda_*$ (*=1, 2, ..., n) in order to convert the solution of the vector into the actual physical quantity.

Figure 2:
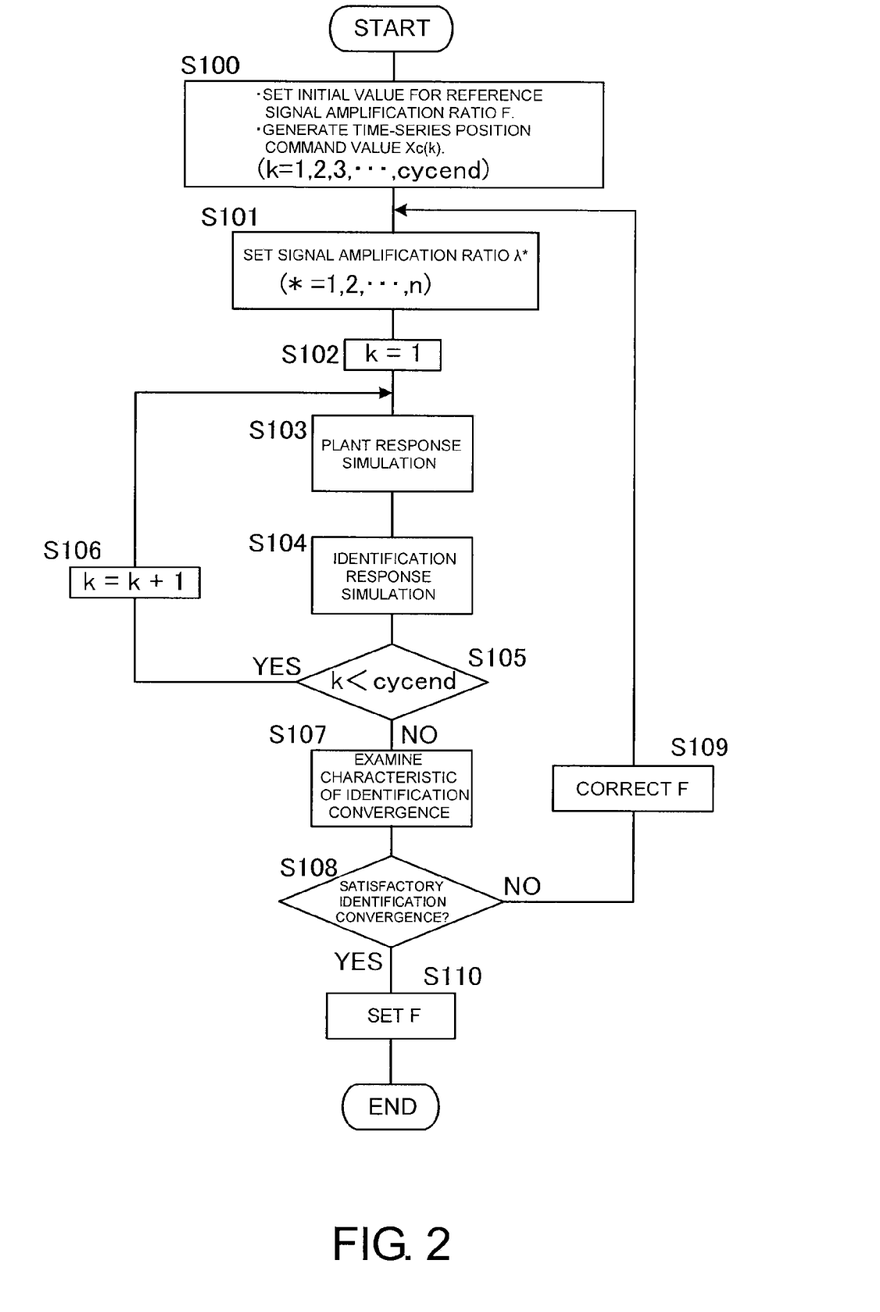
FIG. 2 is a flowchart for explaining an example for determining an appropriate value for a reference signal amplification ratio F to be entered to the position control apparatus of the present invention.

Because the appropriate value for the reference signal amplification ratio F differs depending on the structure of the target plant 100, simulations may be performed in advance to determine the reference signal amplification ratio F. FIG. 2 is a flowchart for explaining an example simulation for calculation. Because the operation of the acceleration/deceleration processor 50 and the process information are well known, at S100, initial setting of the reference signal amplification ratio F and generation of a time-series position command value Xc(k), which the acceleration/deceleration processor 50 outputs upon receiving the position command value X that has been entered to the position control apparatus, are performed until a calculation cycle (k=cycend), within which convergence of identification is satisfactorily completed.

Because the structure of the target plant 100 is already known, the maximum absolute element $\xi_{*\_max}$ (*=1, 2, ..., n) can be determined for the individual column vectors of the signal matrix $\Xi(k)$ at the time of generation of the position command value Xc(k), and at S101 the signal amplification ratio $\lambda_*$ (*=1, 2, . . . , n) can be designated by equation (18). Following this, at step 102, an operation cycle k=1 is set.

At S103, a plant response simulation is performed to calculate the responses of the position control apparatus 10 and the target plant 100 relative to the position command value Xc. The identification signal vector ξ represented by equation (19) is generated in accordance with the obtained information (simulation results), such as the position, the velocity and acceleration. Thereafter, at S104, the operation of the adaptive loop operation unit 60 is performed by identification response simulation to calculate the identified parameter vector ˆγ.

At S106, the operation cycle is increased, and the plant response simulation at S103 and the identification response simulation at S104 are repeated until it is determined at S105 that k=cycend is reached. At S107, the characteristic of convergence of the identified parameter vector ˆγ(k) is examined. In a case where, as a result of examination, it is determined at S108 that convergence of identification is satisfactory, at S110, the current reference signal amplification ratio F is set for the position control apparatus 10.

At S109, correction of the reference signal amplification ratio F is performed. In a case where it is determined at S108 that convergence of identification is slow, the reference signal amplification ratio F is increased, or in a case where it is determined that convergence of identification is excessively fast and overshoot tends to occur, the reference signal amplification ratio F is reduced. Thereafter, program control returns to S101, where the signal amplification ratio $\lambda^*$ is designated again, and the simulation is initiated again beginning with the operation cycle k=1 to repeat the process sequence until it is determined at S108 that the convergence of identification is appropriate.

Figure 3:
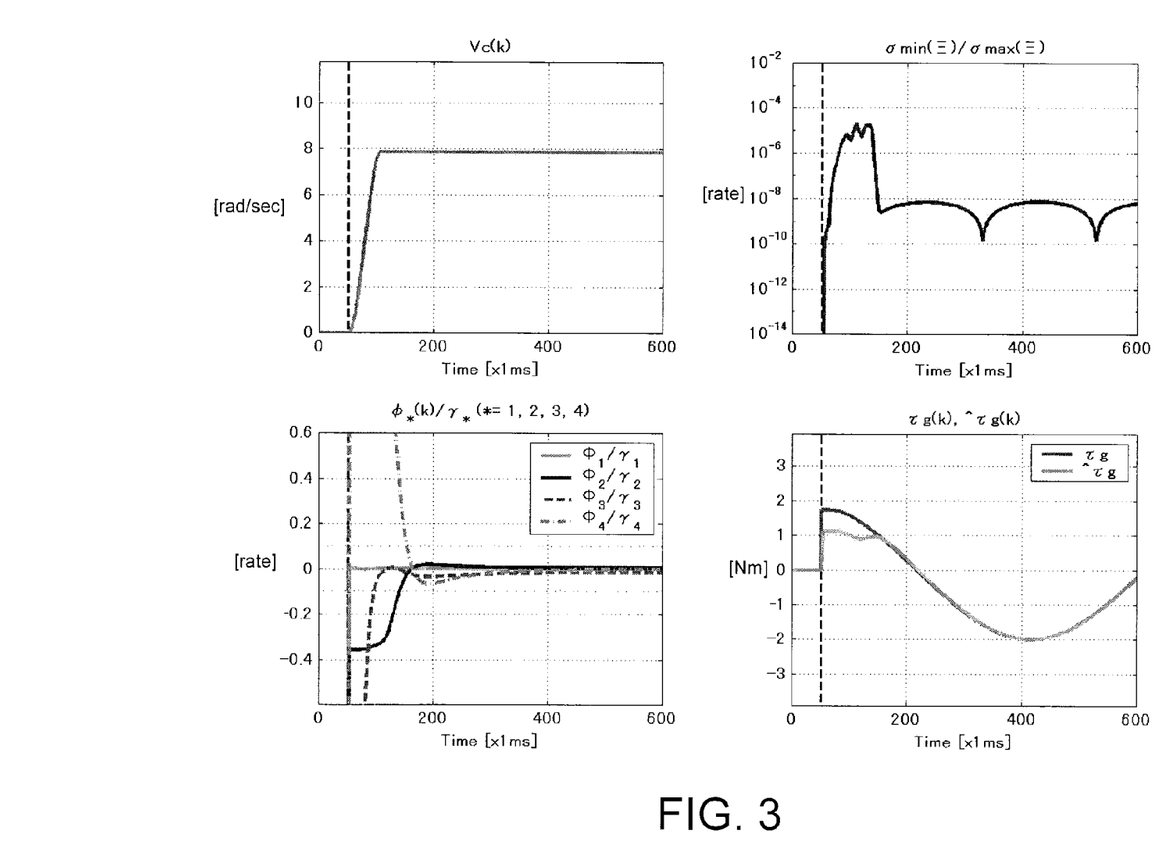
FIG. 3 is a diagram showing an example convergence response of identification performed by the position control apparatus of the present invention.

An example for the characteristic of convergence of parameter identification in this embodiment is shown in FIG. 3. Because the velocity command value Vc(k) and the target plant employed are exactly the same as those employed for the conventional position control apparatus in FIG. 9, the characteristic of convergence of parameter identification can be compared. In this case, reference signal amplification ratio F=0.56 is selected, and the signal amplification ratio $\lambda_*$ is designated as $\lambda_1=1$ and $\lambda_2=\lambda_3=\lambda_4=8$ based on equation (18). Compared with the prior art in FIG. 9, $\sigma_{min}(\Xi)/\sigma_{max}(\Xi)$ during acceleration is increased by about ten times, and in a period of about 100 ms after the acceleration has started, the identification error falls within a range of 10%, and the period required for convergence can be reduced.

Next, assume a case where a linear motion table is employed as a control target, as in the prior art. According to the present invention, as parametric representation for this case, equations (16) and (17) are replaced with equations (21) and (22).

$$\xi=[\lambda_1 \cdot dv/dt, \lambda_2 \cdot v, \lambda_3]^T \quad (21)$$

$$\gamma=[I/\lambda_1, D/\lambda_2, \tau_L/\lambda_3]^T \quad (22)$$

Figure 4:
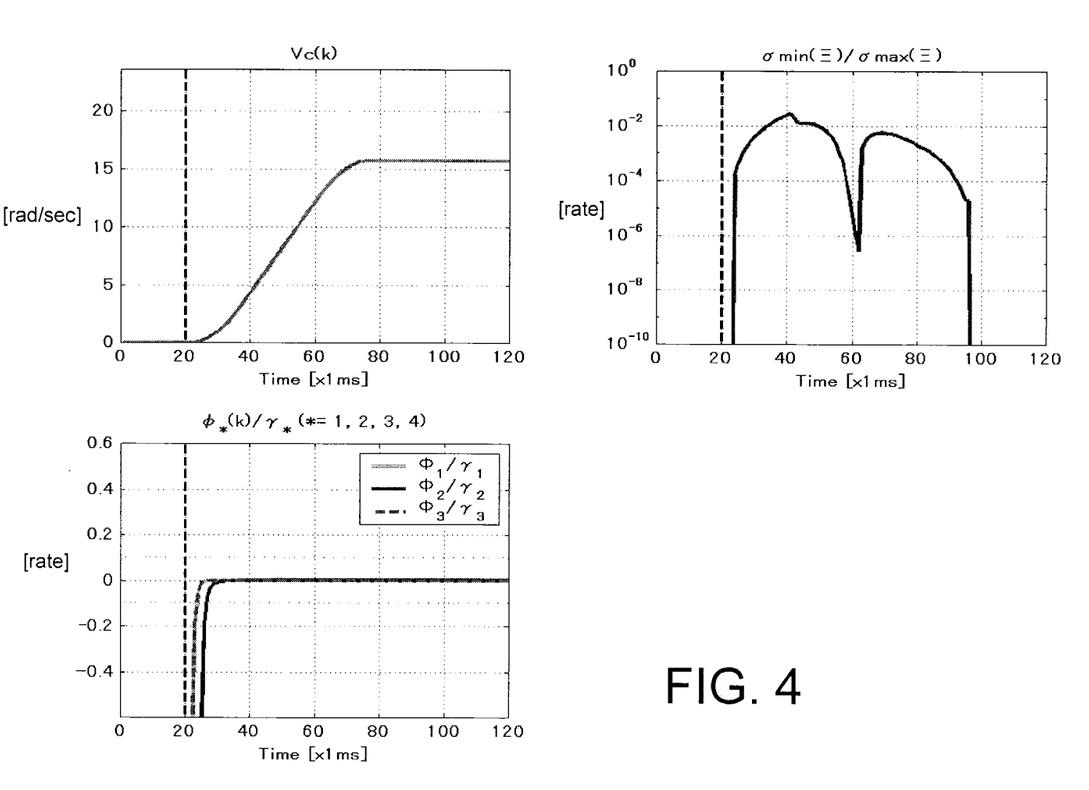
FIG. 4 is a diagram showing another example for the convergence response of identification performed by the position control apparatus of the present invention.

An example for the characteristic of convergence of parameter identification for this embodiment is shown in FIG. 4. Since the velocity command value Vc(k) and the target plant are exactly the same as those employed for the conventional position control apparatus in FIG. 11, the characteristic of convergence of parameter identification can be compared. In this case, reference signal amplification ratio F=2 is selected, and the signal amplification ratio $\lambda_*$ is designated as $\lambda_1=1$, $\lambda_2=10$ and $\lambda_3=40$ based on equation (18). Compared with the prior art in FIG. 11, $\sigma_{min}(\Xi)/\sigma_{max}(\Xi)$ during acceleration is increased by about 10 to 100 times, and within a period of about 10 ms after the acceleration has started, the identification is completed, and the period required for convergence can be reduced to about ⅓.

What is claimed is:

1. A position control apparatus, which identifies a characteristic parameter for a target plant that is a mechanical plant to be controlled, and additionally performs compensation control based on the identified characteristic in accordance with a characteristic for the target plant, comprising:
  a nonlinear element calculation unit for calculating, based on the identified characteristic parameter, a torque compensation value that is to be added to a torque command value;
  a driver for driving a servo motor of the target plant by power generated in accordance with a final torque command value that is obtained by adding the torque compensation value to the torque command value;
  a $\xi_{max}$ detector, configured to output a maximum absolute element, based on a structure of a signal vector of the target plant and predesignated information related to acceleration/deceleration, for each column vector of a signal matrix in which signal vectors obtained during acceleration of the target plant are arranged in a direction of rows in a time series manner;
  a signal matrix gain operation unit configured to calculate a signal amplification ratio for each column vector of the signal matrix based on at least the maximum absolute element;
  a signal vector amplification/generation unit configured to form, based on individual elements of the signal vector and the signal amplification ratio, an identification signal vector that is to be applied for parameter identification calculation; and
  an adaptive loop operation unit for identifying a characteristic parameter for the target plant based on the identification signal vector and the final torque command value.

2. The position control apparatus according to claim 1,
  wherein the signal matrix gain operation unit calculates the signal amplification ratio based on a reference signal amplification ratio and the maximum absolute element, and
  wherein the reference signal amplification ratio is determined by performing a plant response simulation to calculate motions of the position control apparatus and the target plant performed during a period in which an axial movement command is being issued, an identification response simulation to calculate an identified parameter by employing the identification signal vector, which is obtained based on both the signal amplification ratio designated by referring to the reference signal amplification ratio and the results of the plant response simulation, and a correction process for correcting the reference signal amplification ratio in accordance with a convergence characteristic of results of the identification response simulation, and by repeating the plant response simulation, the identification response simulation, and the correction process until it is determined that the convergence characteristic is satisfactory.

3. The position control apparatus according to claim 1, in combination with a servo motor of the target plant operatively connected with and adapted to be driven by the driver by power generated in accordance with the final torque command.

4. A system comprising:
a target plant serving as a component of a numerical controlled machine;
a servo motor configured to drive the target plant;
a detector configured to detect a position of the target plant as a detection position;
a position control apparatus, which identifies a characteristic parameter for a the target plant, and performs compensation control on the target plant based on the identified characteristic parameter in accordance with a characteristic for the target plant, the position control apparatus comprising:
a nonlinear element calculation unit for calculating, based on the identified characteristic parameter, a torque compensation value that is to be added to a torque command value;
a driver for driving a the servo motor by power generated in accordance with a final torque command value that is obtained by adding the torque compensation value to the torque command value;
a $\xi_{max}$ detector, configured to output a maximum absolute element, based on a structure of a signal vector of the target plant and predesignated information related to acceleration/deceleration, for each column vector of a signal matrix in which signal vectors obtained during acceleration of the target plant are arranged in a direction of rows in a time series manner;
a signal matrix gain operation unit configured to calculate a signal amplification ratio for each column vector of the signal matrix based on at least the maximum absolute element;
a signal vector amplification/generation unit configured to generate, based on the detection position detected by the detector and an acceleration of the target plant obtained by performing differentiation on the detection position twice, a signal vector including the detection position and the acceleration as elements, and configured to form, based on the signal vector and the signal amplification ratio, an identification signal vector that is to be applied for parameter identification calculation; and
an adaptive loop operation unit for identifying a characteristic parameter for the target plant based on the identification signal vector and the final torque command value.

5. The system according to claim 4, wherein
the signal matrix gain operation unit calculates the signal amplification ratio based on a reference signal amplification ratio and the maximum absolute element, and
the reference signal amplification ratio is determined by performing a plant response simulation to calculate motions of the position control apparatus and the target plant performed during a period in which an axial movement command is being issued, an identification response simulation to calculate an identified parameter by employing the identification signal vector, which is obtained based on both the signal amplification ratio designated by referring to the reference signal amplification ratio and the results of the plant response simulation, and a correction process for correcting the reference signal amplification ratio in accordance with a convergence characteristic of results of the identification response simulation, and by repeating the plant response simulation, the identification response simulation, and the correction process until it is determined that the convergence characteristic is satisfactory.

* * * * *